United States Patent
Hirschhorn

(10) Patent No.: US 8,196,883 B2
(45) Date of Patent: Jun. 12, 2012

(54) DUAL-PIVOTING ADJUSTABLE SUPPORT ARM

(76) Inventor: Bruce D. Hirschhorn, Boonton, NJ (US)

( * ) Notice: Subject to any disclaimer, the term of this patent is extended or adjusted under 35 U.S.C. 154(b) by 0 days.

(21) Appl. No.: 13/117,180

(22) Filed: May 27, 2011

(65) Prior Publication Data

US 2011/0226918 A1    Sep. 22, 2011

Related U.S. Application Data

(62) Division of application No. 12/105,452, filed on Apr. 18, 2008, now Pat. No. 7,971,840, which is a division of application No. 10/457,158, filed on Jun. 9, 2003, now Pat. No. 7,369,672.

(60) Provisional application No. 60/391,281, filed on Jun. 24, 2002.

(51) Int. Cl.
*E04G 3/00* (2006.01)

(52) U.S. Cl. .............. 248/276.1; 248/274.1; 248/280.11; 248/282.1; 248/284.1; 248/292.11; 403/78; 403/161; 403/164; 403/165

(58) Field of Classification Search .............. 248/274.1, 248/276.1, 280.11, 282.1, 284.1, 292.11; 403/78, 161, 164, 165
See application file for complete search history.

(56) References Cited

U.S. PATENT DOCUMENTS

| | | | | |
|---|---|---|---|---|
| 3,322,886 | A * | 5/1967 | Warshawsky | 174/86 |
| 4,561,797 | A * | 12/1985 | Aldridge | 403/58 |
| 5,842,672 | A * | 12/1998 | Sweere et al. | 248/278.1 |
| 6,264,152 | B1 * | 7/2001 | Bloch et al. | 248/274.1 |
| 6,409,134 | B1 * | 6/2002 | Oddsen, Jr. | 248/274.1 |
| 6,695,270 | B1 * | 2/2004 | Smed | 248/274.1 |
| 6,779,767 | B2 * | 8/2004 | Kuhn | 248/276.1 |
| 7,048,242 | B2 * | 5/2006 | Oddsen, Jr. | 248/280.11 |
| 7,264,212 | B2 * | 9/2007 | Hung | 248/282.1 |
| 7,334,956 | B2 * | 2/2008 | Taylor | 403/87 |
| 7,646,161 | B2 * | 1/2010 | Albu-Schaffer et al. | 318/568.2 |
| 7,703,733 | B2 * | 4/2010 | Price et al. | 248/288.31 |
| 7,954,777 | B2 * | 6/2011 | Bohm et al. | 248/278.1 |
| 7,971,840 | B2 * | 7/2011 | Hirschhorn | 248/281.11 |
| 8,020,823 | B2 * | 9/2011 | Wang | 248/278.1 |
| 2010/0084527 | A1 * | 4/2010 | Lau et al. | 248/217.4 |

* cited by examiner

Primary Examiner — Terrell McKinnon
Assistant Examiner — Michael McDuffie
(74) Attorney, Agent, or Firm — Michael J. Weins; Jeffrey E. Semprebon

(57) ABSTRACT

An adjustable arm supports a device housing with respect to a base and allows the position of the device housing to be adjusted as desired. The adjustable arm has rigid segments joined by pivot joints, with passages therethrough to allow wires to be strung through the arm segments and joints so as to be shielded by the arm. At least one joint is a dual-pivot joint having two joint elements that rotate with respect to each other about a joint pivot axis, each joint element in turn being pivotably attached to an adjacent arm segment.

4 Claims, 5 Drawing Sheets

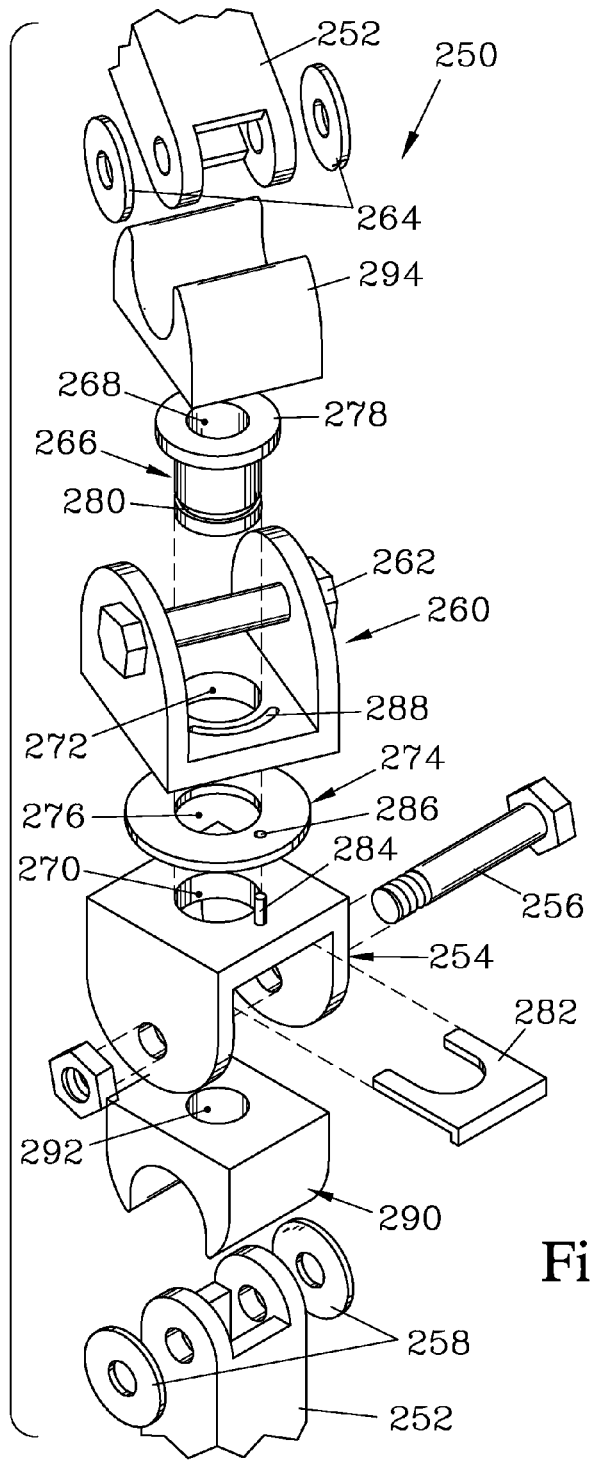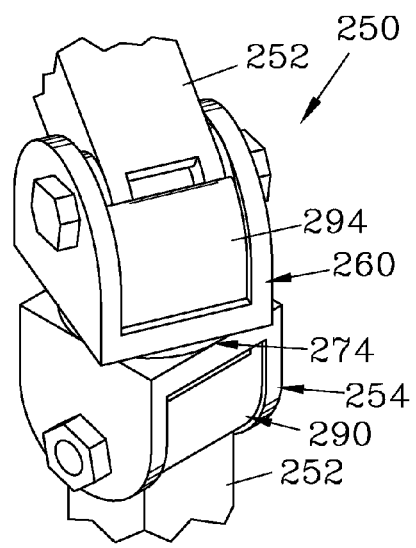
Figure 5
Figure 6

DUAL-PIVOTING ADJUSTABLE SUPPORT ARM

FIELD OF THE INVENTION

The present invention relates to an adjustable arm suitable for supporting an audio visual device in a desired position with respect to a base.

BACKGROUND OF THE INVENTION

Small, individual audio visual devices are frequently used to provide both entertainment and information to users. While such devices can be handheld, it is often desirable for the device to be positionable with respect to a base to avoid a need for the user to hold the device in a suitable position for long periods of time.

One approach to supporting an audio visual device is taught in U.S. Pat. No. 6,104,443, which teaches a suspended television receiver or video monitor. The television receiver of the '443 patent is mounted to a positioning mechanism that allows the user to place the television receiver at a desired location and angle for comfortable viewing. The '443 patent discloses both a flexible gooseneck and a parallel arm structure where the parallel arms are connected to provide a scissor-type action as they are adjusted to position the television receiver. A gooseneck makes precisely positioning the television receiver difficult for a user, since the gooseneck can have a large elastic component when bent, which will relax once the user releases the television receiver. Alternatively, the gooseneck may be subject to drooping under the weight of the television receiver as the distance from the base increases. Additionally, a gooseneck is not well suited for readily moving the television receiver between viewing and storage positions. The alternative positioning mechanism taught in the '443 patent, which uses parallel arms, can pinch the user the position of the television receiver is adjusted.

SUMMARY OF THE INVENTION

The present invention relates to an adjustable arm suitable for supporting an audio visual device with respect to a base to allow the position of the device to be adjusted so as to direct the visual display and sound to the location of a viewer. The base typically rests on a horizontal surface.

The adjustable arm has an arm first end and an arm second end, and the adjustability of the arm is provided by forming the arm with arm segments that are connected together with pivoting joints. The use of a segmented arm allows the localization of the movement to the pivoting joints that connect the segments, and the concentration of the relative movement allows finer control of the motion. Resistance to creep is provided by frictional resistance between the elements of the pivoting joints, and in some embodiments the degree of friction between components of the joint can be adjusted.

The arm segments and pivoting joints provide one or more continuous internal paths of sufficient size to allow passing cables and/or wires through the arm to convey power and/or audio visual signals from the base to the device supported on the arm. The arm can be configured such that continuous wires can be passed through the arm elements.

One or more of the pivot joints between the arm segments can have dual pivot axes which are rotatably mounted with respect to each other and rotate in planes with are parallel to each other. Each of the connected arm segments in turn is pivotally mounted with respect to one of the dual pivot axes.

BRIEF DESCRIPTION OF THE DRAWINGS

FIG. 5 is an exploded isometric view of another embodiment of a dual pivot axis adjustable joint of the present invention, which shares many features of the adjustable joint illustrated in FIGS. 3 and 4. This embodiment differs, in part, in the use of cowlings to assure that the cables are maintained within the joint. It also employs a quick release coupling for separation of two saddle brackets into which the arm segments are pivotally mounted.

FIG. 6 is a view of the adjustable joint of FIG. 5 when assembled.

FIG. 8 also illustrates two alternative clips which can be employed in the coupling to adjust the degree of friction between the saddle brackets.

DETAILED DESCRIPTION OF THE PREFERRED EMBODIMENTS

Figure 1:
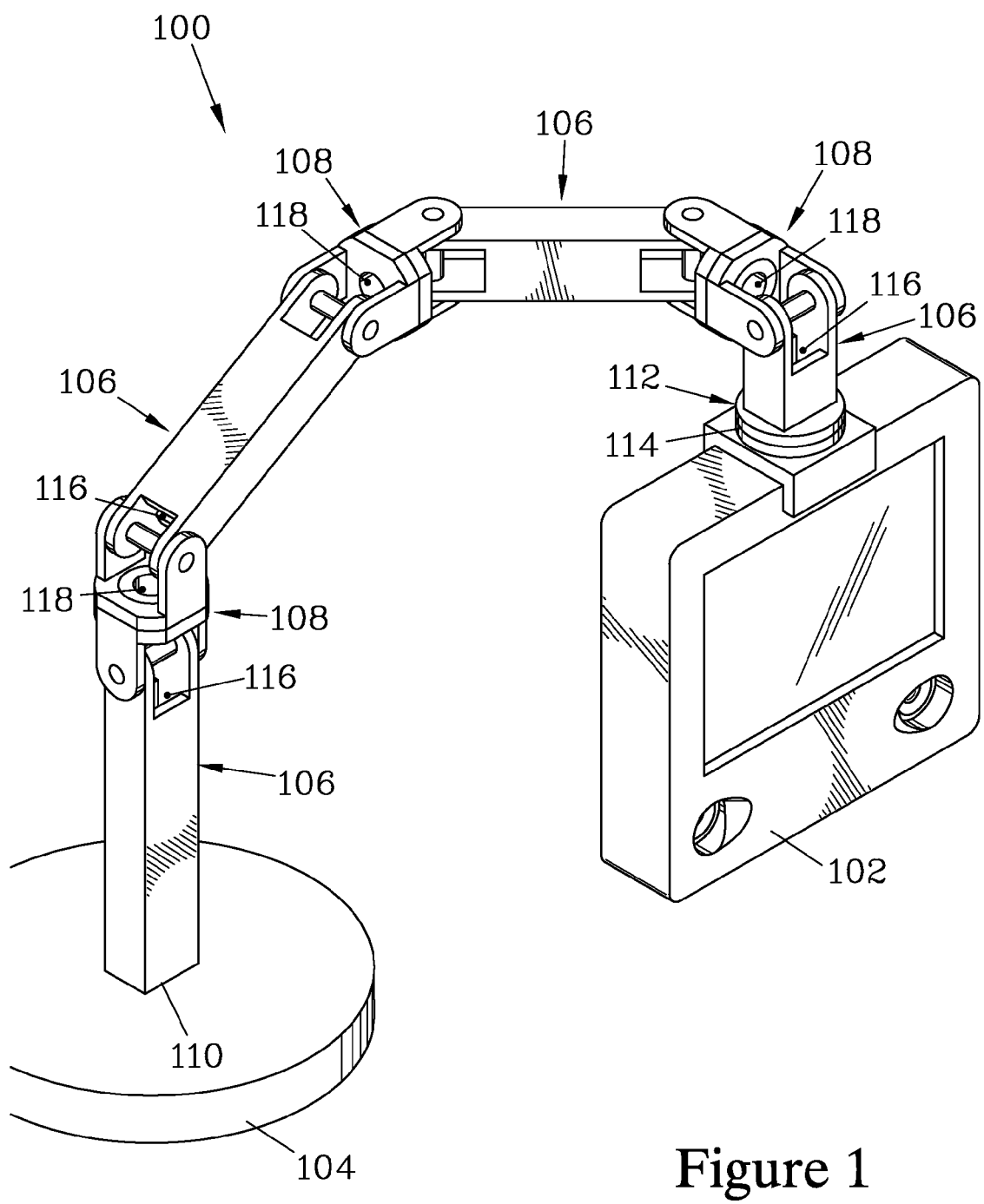
FIG. 1 is an isometric view illustrating an adjustable arm which forms one embodiment of the present invention, which serves to support a device housing at a desired position with respect to a base. In this embodiment, the arm is constructed from a series of hollow arm segments connected by adjustable joint assemblies having dual pivot axes which are rotatable with respect to each other to provide three degrees of freedom between adjacent arm segments. This adjustable arm configuration is well suited for applications where power and signals are to be provided from the base to the device housing by power and signal cables, since the arm provides a continuous passage along its length through which shielded cables can be passed with sufficient shielding to prevent interference of the power with the audio/video signals. The adjustable joint assemblies, with their dual axes which are adjustable with respect to each other, maintain the flexibility of the arm so that it can be passed around obstacles; however, due to the localization of the pivotal action, the arm can be easily readjusted and has a low susceptibility to drooping. This arm configuration is also readily foldable to facilitate storage.

FIG. 1 illustrates an adjustable arm 100 which forms one embodiment of the present invention. The adjustable arm 100 serves to support a device housing 102 in a desired position and orientation with respect to a base 104. The adjustable arm 100 is constructed from rigid arm segments 106 that are pivotally and rotatably engaged with respect to each other with bi-pivotable adjustable joint assemblies 108 to provide for adjustability. Examples of structures that can provide these joint assemblies 108 are discussed below with reference to FIGS. 2-10. The use of the rigid arm segments 106 in the adjustable arm 100 allows fine adjustment of the adjustable arm 100 to position the device housing 102, since the freedom of motion is localized at the bi-pivotable adjustable joint assemblies 108, which makes the adjustable arm 100 less subject to spring-back than continuously-adjustable structures for positioning, such as the traditional use of a flexible "gooseneck". The freedom of adjustability offered by using the bi-pivotable adjustable joint assemblies 108 in the arm 100 permits the arm 100 to traverse a non-planar path, allowing the arm 100 to be configured so as to pass around obstacles.

The adjustable arm 100 terminates in an arm first end 110 and an arm second end 112. The arm first end 110 is affixed to the base 104, while the arm second end 112 is attached to the device housing 102 and incorporates a pivot coupling 114. The rigid arm segments 106 each have arm segment passages 116 therethrough, and the adjustable joint assemblies 108 each have a joint passage 118 therethrough to allow cables and power cords (not shown) to be passed through the adjustable arm 100 from the base 104 to the device housing 102. While the arm segments 106 are illustrated as being formed of rectangular tubular stock, other tubular shapes could be employed while allowing cables to be passed therethrough. In the arm 100, wires and/or cables can be threaded through the elements of the arm 100 either before or after the rigid arm segments 106 and the adjustable joint assemblies 108 have been assembled to form the arm 100.

Having the arm segments 106 formed as single elements has advantages over the use of paired elements that are pivotably joined so as to change their spacial separation as the arm is adjusted, such as is taught in U.S. Pat. No. 6,104,443. The adjustable arm 100 may be adjusted by the user without concern of being pinched when manipulating the arm segments, since the adjustable arm 100 does not have paired elements in the arm segments 106 which could be brought into contact during use as the user manipulates elements of the arm 100.

Figure 2:
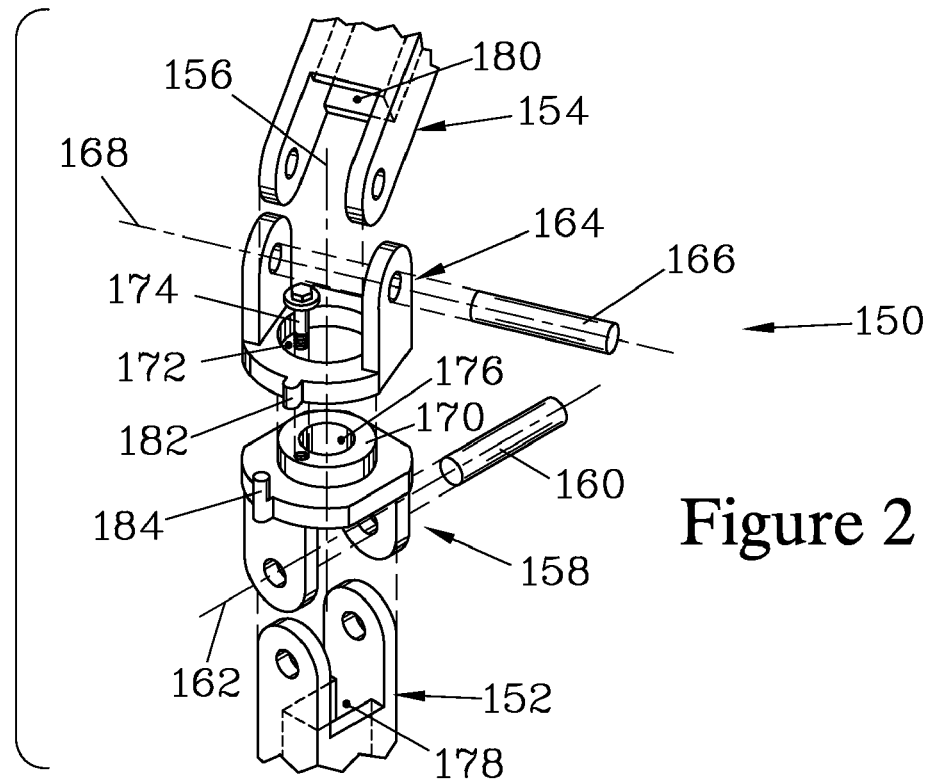
FIG. 2 is an exploded view showing details of one adjustable dual pivot axis joint assembly that could be employed to connect two adjacent arm segments of the embodiment shown in FIG. 1. The adjustable joint assembly has a joint passage therethrough that allows for the passage of a cable through the length of the arm and permits the cable to provide both power and signals to the device housing via cords and cables, without requiring the cords and cables to pass outside the joint. In this embodiment, maintaining the cables internal relies on the stiffness of the cables, and the frictional forces of the joint are not readily adjustable.

FIG. 2 illustrates one example of a bi-pivotable adjustable joint assembly 150 which could be employed to provide the joint assemblies 108 in the embodiment illustrated in FIG. 1. FIG. 2 shows the adjustable joint assembly 150 exploded. The adjustable joint assembly 150 provides pivotal motion between an arm first segment 152 and an arm second segment 154, allowing pivotable adjustment between the arm segments (152, 154), as well as allowing rotation of the pivotal movement of each of the arm segments (152, 154) with respect to the other about a bracket rotation axis 156.

The adjustable joint assembly 150 employs a first saddle bracket 158, which pivotably, slidably engages the arm first segment 152 and, once engaged, is held there by friction forces either by direct contact of the engaging surfaces or through contact with an intermediate element maintained therebetween (this latter scheme being discussed below in the description of FIGS. 3 and 4). A first pivot pin 160 passing through the first saddle bracket 158 and through the arm first segment 152 provides a first pivot axis 162. Similarly, a second saddle bracket 164 pivotably, slidably engages the arm second segment 154 and, once engaged, is held by friction forces either by direct contact of the engaging surfaces or through contact with an intermediate element maintained therebetween. A second pivot pin 166 passing through the second saddle bracket 164 and the arm second segment 154 provides a second pivot axis 168.

The saddle brackets (158, 164) are rotatably engaged with each other about the bracket rotation axis 156, and means are provided to maintain the saddle brackets (158, 164) in frictional engagement. In the adjustable joint assembly 150 illustrated, the first saddle bracket 158 has a saddle post 170 which rotatably, slidably engages a saddle passage 172 in the second saddle bracket 164. A tie down bolt 174 threadably engages the saddle post 170 and extends over the second saddle bracket 164, serving to secure the two saddle brackets (158, 164) with respect to each other. As the saddle brackets (158, 164) are rotated with respect to each other about the bracket rotation axis 156, the first pivot axis 162 is rotated with respect to the second pivot axis 168.

The saddle post 170 has a joint passage 176 therethrough, which is of sufficient size to accommodate cables and power cords (not shown) without binding.

Preferably, blocking means are provided to limit the rotation between the saddle brackets (158, 164) to somewhat less than 360° to avoid undue twisting of the cables and/or the power cord passing therethrough. One simple blocking means can be provided by a first block 182 extending radially outward from the second saddle bracket 164 and a second block 184 which is affixed to the first saddle bracket 158 and which is positioned to engage the first block 182 as the saddle brackets (158, 164) are rotated with respect to each other, this engagement serving to limit rotation between the first saddle bracket 158 and the second saddle bracket 164.

The arm segments (152, 154) can be pivoted with respect to each other by applying a force sufficient to overcome the friction between one of the arm segments (152, 154) and its associated saddle bracket (158, 164). Once readjusted, the arm segments (152, 154) are maintained in the new position by friction between the saddle brackets (158, 164) and their associated arm segments (152, 154). Similarly, rotation between the arm segments (152, 154) is provided by rotation between the saddle brackets (158, 164). This rotation is provided by applying a twisting torque between the saddle brackets (158, 164) to overcome friction between the two saddle brackets (158, 164).

Figure 3:
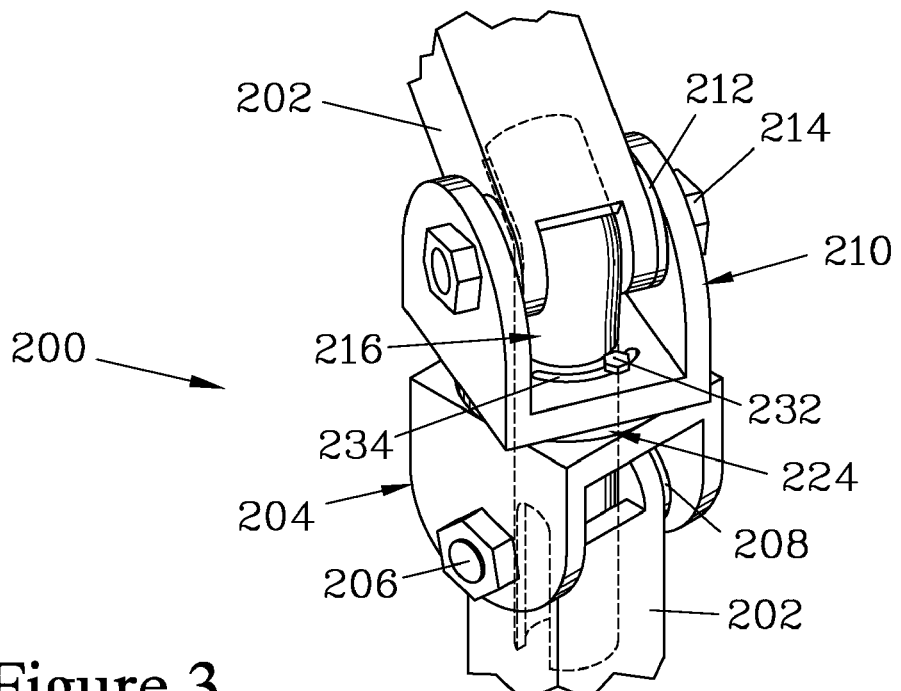
FIG. 3 is an assembled view of another dual pivot axis adjustable joint which provides a range of motion similar to that of the adjustable joint shown in FIG. 2. The adjustable joint shown in FIG. 3 is designed so that the frictional forces resisting movement of arm segments with respect to each other and the frictional forces between two saddle brackets are adjustable. This embodiment also has a flexible tube that serves as a cable sheath for maintaining the cable within the confines of the joint when the joint is flexed.
Figure 4:
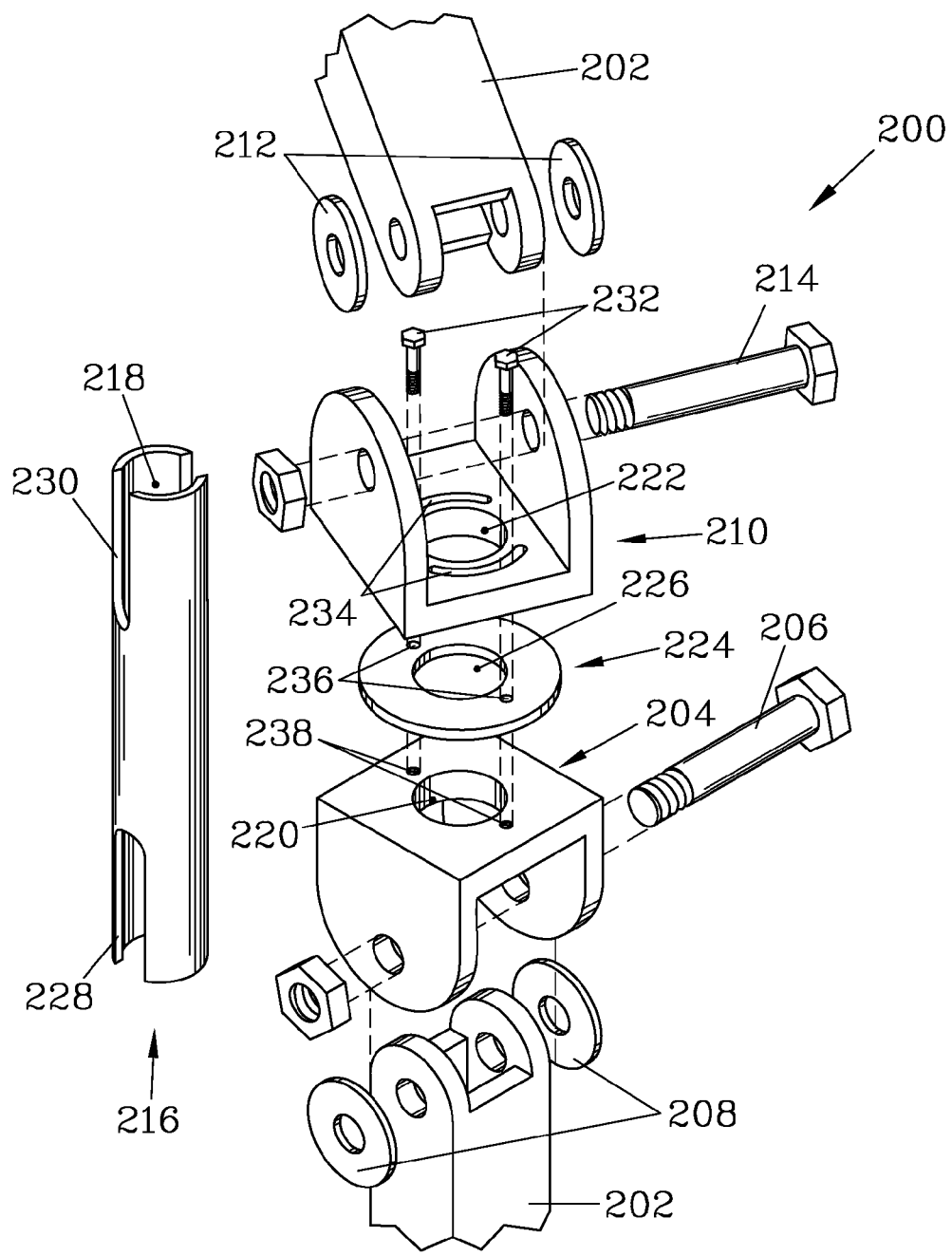
FIG. 4 is an exploded view of the joint illustrated in FIG. 3.

FIGS. 3 and 4 illustrate an alternative bi-pivotable adjustable joint assembly 200 which could be employed in an embodiment such as that illustrated in FIG. 1. The adjustable joint assembly 200 is shown assembled in FIG. 3 and exploded in FIG. 4. The adjustable joint assembly 200 again provides pivotal and rotational motion between two rigid arm segments 202, but also provides protection against exposure for cables and/or wires (not shown) passing through the adjustable joint assembly 200.

The adjustable joint assembly 200 has a first saddle bracket 204, which pivotably engages one of the rigid arm segments 202 and is mounted thereto by a first pivot bolt 206. A first pair of friction washers 208 are interposed between the rigid arm segment 202 and the first saddle bracket 204, and the first pivot bolt 206 can be tightened to compress the first pair of friction washers 208 to vary the frictional resistance to pivoting between the rigid arm segment 202 and the first saddle bracket 204. Similarly, a second saddle bracket 210 pivotably engages another of the rigid arm segments 202, and friction to resist pivoting is provided by a second pair of friction washers 212 and a second pivot bolt 214.

A flexible tube 216 is provided, which is better shown in the exploded view of FIG. 4. The flexible tube 216 has a joint passage 218 therethrough, which provides a conduit for cables and/or wiring. In FIG. 4, the flexible tube 216 is shown off to the side to more clearly show the structure of the various components of the adjustable joint assembly 200. The flexible tube 216 is sized to slidably engage a first bracket passage 220 in the first saddle bracket 204 and a second bracket passage 222 in the second saddle bracket 210. Interposed between the first saddle bracket 204 and the second saddle bracket 210 is a friction ring 224 having a friction ring passage 226 through which the flexible tube 216 also passes. The flexible tube 216 has a first bolt notch 228, configured to accommodate the first pivot bolt 206, and a second bolt notch 230, configured to accommodate the second pivot bolt 214. As the first saddle bracket 204 rotates relative to the second saddle bracket 210, the first bolt notch 228 and the second bolt notch 230 rotate with the saddle brackets (204, 210), twisting the flexible tube 216. While the flexible tube 216 is sufficiently elastic to accommodate some twisting due to rotation, this twisting may limit the rotation between the first saddle bracket 204 and the second saddle bracket 210.

The saddle brackets (204, 210) are attached together by a pair of bracket bolts 232. The bracket bolts 232 pass through bolt slots 234 in the second saddle bracket 210 and through bolt passages 236 in the friction ring 224, and threadably engage bolt receivers 238 in the first saddle bracket 204. Advancing the bracket bolts 232 in the bolt receivers 238 draws the first saddle bracket 204 and the second saddle bracket 210 together, compressing the friction ring 224 and increasing the frictional resistance to rotation between the first saddle bracket 204 and the second saddle bracket 210. The bolt slots 234 in the second saddle bracket 210, in combination with the bracket bolts 232, provide the means for rotatably engaging the first saddle bracket 204 with the second saddle bracket 210, and also provide blocking means to limit the rotation between the saddle brackets (204, 210). This limits twisting of the flexible tube 216 and any cables and/or wiring passing therethrough.

FIGS. 5-10 illustrate another bi-pivotable adjustable joint assembly 250 which provides pivotal and rotational motion between two rigid arm segments 252, as well as providing protection against exposure for cables and/or wires passing through the adjustable joint assembly 250. FIG. 5 is an exploded view of the adjustable joint assembly 250, while FIG. 6 is an assembled view of the adjustable joint assembly 250.

The adjustable joint assembly 250 again has a first saddle bracket 254, which is pivotably attached to one of the rigid arm segments 252 by a first pivot bolt 256. A first pair of friction washers 258 are compressed between the rigid arm segment 252 and the first saddle bracket 254 as the first pivot bolt 256 is tightened to adjust the frictional resistance to pivoting between the rigid arm segment 252 and the first saddle bracket 254. A second saddle bracket 260 is pivotably attached to another of the rigid arm segments 252 by a second pivot bolt 262, and friction to resist pivoting is provided by a second pair of friction washers 264.

Figure 7:
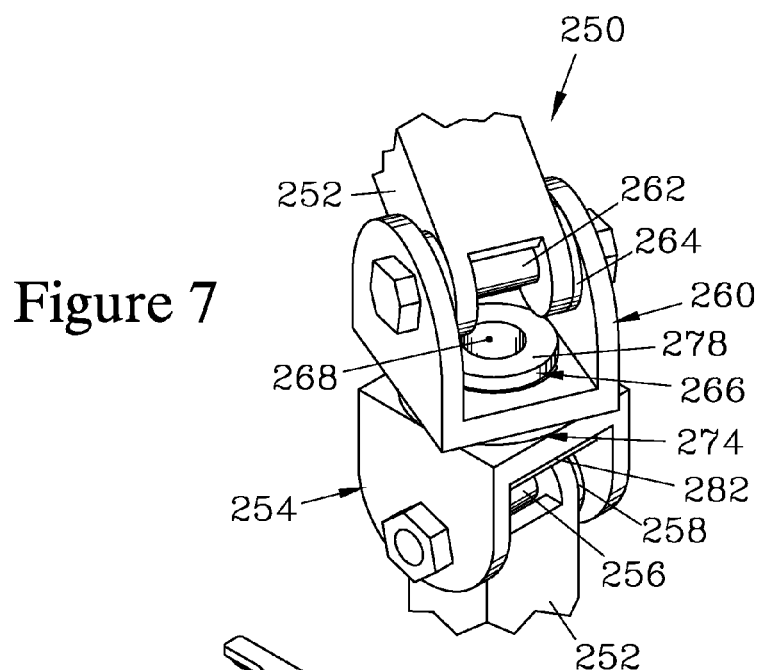
FIG. 7 illustrates the adjustable joint shown in FIGS. 5 and 6 assembled; however, in this view the cowlings are not shown.
Figure 8:
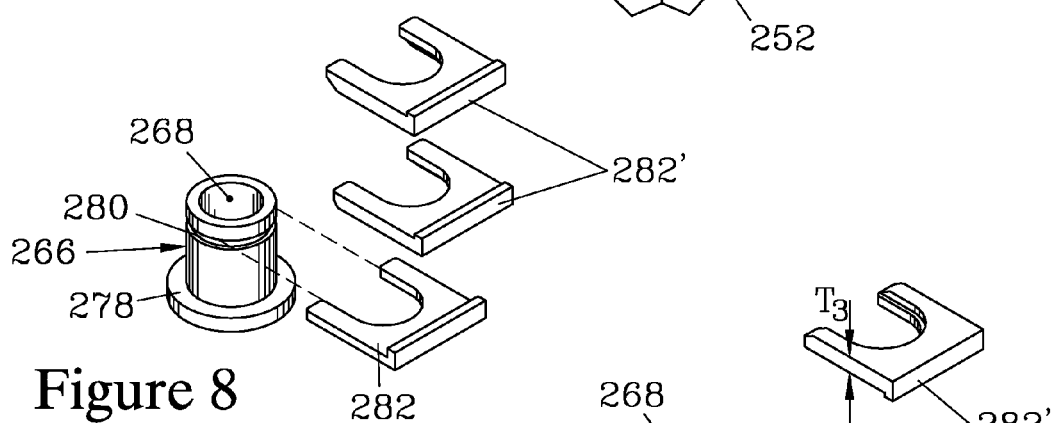
FIG. 8 illustrates the quick release coupling employed in the adjustable joint shown in FIGS. 5-7 when unassembled.
Figure 9:
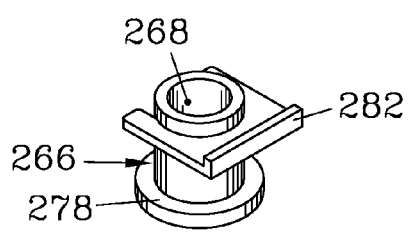
FIG. 9 illustrates the quick release coupling shown in FIG. 8 when assembled.

In this embodiment, a rigid tube 266 provides a conduit for cables and/or wiring (not shown), and serves to rotatably engage the first saddle bracket 254 and the second saddle bracket 260. In this embodiment, the rigid tube 266 also serves to attach the first saddle bracket 254 and the second saddle bracket 260 together. The rigid tube 266 has a joint passage 268 therethrough, and rotatably engages a first bracket passage 270 in the first saddle bracket 254 and a second bracket passage 272 in the second saddle bracket 260, shown in FIG. 5. Interposed between the first saddle bracket 254 and the second saddle bracket 260 is a friction ring 274 having a friction ring passage 276 through which the rigid tube 266 passes. The rigid tube 266 has a tube flange 278 and a clip notch 280, as best shown in FIG. 8. When the saddle brackets (254, 260) are pressed together with the friction ring 274 compressed therebetween, the rigid tube 266 is passed through the second bracket passage 272, the friction ring passage 276, and the first bracket passage 270 and is secured by a retainer clip 282 that slidably engages the clip notch 280 on the rigid tube 266, as shown in FIG. 9. FIG. 7 shows the retainer clip 282, when engaged in the clip notch 280, and the tube flange 278 serving to maintain the first saddle bracket 254 and the second saddle bracket 260 connected together with a degree of compression on the friction ring 274 positioned between the first saddle bracket 254 and the second saddle bracket 260.

Figure 10:
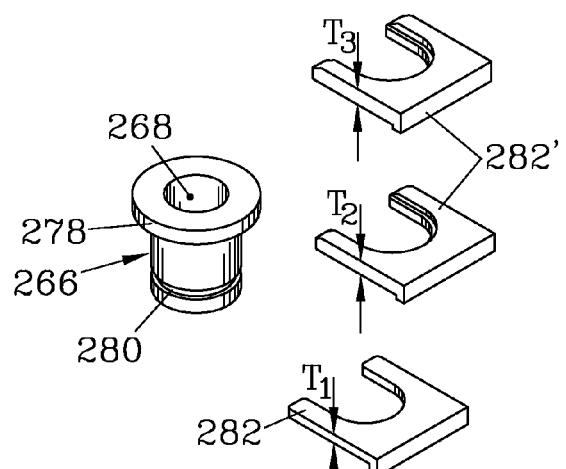
FIG. 10 illustrates the elements shown in FIG. 8 in an inverted position to more clearly show the structure of the alternative clips.

The degree of friction between the saddle brackets (254, 260) could be adjusted by varying the thickness and/or the compressibility of the friction ring 274. However, to allow the degree of friction to be adjusted after the elements of the adjustable joint assembly have been strung onto wires and/or cables, it is preferred to provide alternative retainer clips 282' (shown in FIGS. 8 and 10) that can be substituted for the retainer clip 282 to adjust the degree of compression of the friction ring 274. While the retainer clips 282' are configured to engage the clip notch 280 of the rigid tube 266, they each have a greater effective thickness ($T_2$, $T_3$) than the thickness $T_1$ of the retainer clip 282, as shown in FIG. 10. Due to this greater effective thickness ($T_2$, $T_3$), the retainer clips 282' draw the saddle brackets (254, 260) closer together when engaged with the clip notch 280, providing increased compression of the friction ring 274 and correspondingly greater friction between the saddle brackets (254, 260). A similar effect could be achieved by interposing a shim at some point between the retainer clip 282 and the tube flange 278 of the rigid tube 266.

Referring again to FIG. 5, a post 284 on the first saddle bracket 254 passes through a post passage 286 in the friction ring 274 and engages a slot 288 in the second saddle bracket 260. The post 284 and the slot 288 provide blocking means to limit the rotation between the saddle brackets (254, 260).

To protect any cables and/or wires from exposure, the first saddle bracket 254 is provided with a first cowling 290 having a first cowling passage 292 therethrough. The first cowling 290 is formed of a resilient compressible material, and is configured to substantially fill open spaces in the first saddle bracket 254 as it pivots relative to the rigid arm segment 252, as shown in FIG. 6. Similarly, the second saddle bracket 260 is provided with a second cowling 294 of resilient compressible material, having a second cowling passage (not shown) therethrough and configured to substantially fill open spaces in the second saddle bracket 260. The coverage provided by the first cowling 290 and the second cowling 294 can be appreciated by comparison of FIG. 6, where the cowlings (290, 294) are shown in place, with FIG. 7, discussed earlier, where the cowlings (290, 294) are omitted to more clearly show the interaction of the tube flange 278 of the rigid tube 266 with the second saddle bracket 260.

While the novel features of the present invention have been described in terms of particular embodiments and preferred applications, it should be appreciated by one skilled in the art that substitution of materials and modification of details can be made without departing from the spirit of the invention.

What I claim is:

1. A dual-pivoting joint for an adjustable arm, the dual-pivoting joint adjustably connecting an arm first rigid segment to an arm second rigid segment and comprising:
 a first saddle bracket frictionally engaging and pivotably attaching to the arm first rigid segment, said first saddle bracket having a first pivot axis, about which the arm first rigid segment pivots;
 a first bracket passage through said first saddle bracket;
 a second saddle bracket frictionally engaging and pivotably attaching to the arm second rigid segment, said second saddle bracket having a second pivot axis, about which the arm second rigid segment pivots;
 a second bracket passage through said second saddle bracket;
 a friction ring interposed between said first saddle bracket and said second saddle bracket;
 a friction ring passage through said friction ring;
 a joint passage communicating between said first saddle bracket and said second saddle bracket;
 a bracket rotation axis about which said first saddle bracket and said second saddle bracket can rotate with respect to each other, said bracket rotation axis being normal to the first pivot axis and to the second pivot axis so as to allow these axes to rotate with respect to each other; and
 means for rotatably and frictionally engaging said first saddle bracket with said second saddle bracket so as to allow relative rotation therebetween about said bracket rotation axis, wherein said means for rotatably and frictionally engaging said first saddle bracket with said second saddle bracket further comprises:
  a rigid tube passing through and rotatably engaging said first bracket passage and said second bracket passage, and passing through said friction ring passage, said joint passage being provided through said rigid tube, said rigid tube having,
   a tube flange for forcibly engaging one of said first saddle bracket and said second saddle bracket, and
   a clip notch; and
  a clip for engaging said clip notch and for forcibly engaging the other of said first saddle bracket and said second saddle bracket,
   said clip notch of said rigid tube being spaced apart from said tube flange such that, when said clip is engaged with said clip notch, a compressive load is applied to said friction ring, said tube flange and said clip thereby providing means for limiting the position of said first saddle bracket with respect to said second saddle bracket so as to apply a compressive force on said friction ring positioned therebetween.

2. The dual-pivoting joint of claim 1 further comprising:
 blocking means for limiting rotation of said first saddle bracket with respect to said second saddle bracket about said bracket rotation axis.

3. An adjustable arm for supporting a device housing with respect to a base, the adjustable arm comprising:
 an arm first rigid segment that is supportably connected to the base and having an arm first segment passage therethrough;
 an arm second rigid segment to which the device housing is supportably connected, having an arm second segment passage therethrough;
 a dual-pivot joint having,
  a first joint element frictionally and pivotably engaging said arm first rigid segment so as to pivot about a first pivot axis and having a first joint element passage therethrough,
  a second joint element frictionally and pivotably engaging said arm second rigid segment so as to pivot about a second pivot axis and having a second joint element passage therethrough,
  a friction element interposed between said first joint element and said second joint element and having a friction element passage therethrough,
   said friction element passage aligning with and communicating with said first joint element passage and said second joint element passage, and
  means for connecting said first joint element to said second joint element so as to apply a compressive force on said friction element and allow at least limited rotation about a joint rotation axis that is normal to the first pivot axis and the second pivot axis, wherein said means for connecting said first joint element to said second joint element further comprises:
   a rigid tube passing through and rotatably engaging said first joint element passage and said second joint element passage, and passing through said friction element passage, said rigid tube having,
    a tube passage therethrough allowing communication between said arm first segment passage and said arm second segment passage,
    a tube flange for forcibly engaging one of said first joint element and said second joint element, and
    a clip notch; and
   a clip for engaging said clip notch and for forcibly engaging the other of said first joint element and said second joint element,
    said clip notch of said rigid tube being spaced apart from said tube flange such that, when said clip is engaged with said clip notch, a compressive load is applied to said friction element.

4. The adjustable arm of claim 3 wherein said dual-pivot joint further comprises:
 blocking means for limiting rotation of said first joint element with respect to said second joint element about said joint rotation axis.

* * * * *